United States Patent [19]

Johnson et al.

[11] Patent Number: 4,547,716
[45] Date of Patent: Oct. 15, 1985

[54] VEHICLE WINDSHIELD CLEANER CONTROL

[75] Inventors: Lynville G. Johnson, Kettering; James O. Elliott, Beavercreek, both of Ohio

[73] Assignee: General Motors Corporation, Detroit, Mich.

[21] Appl. No.: 651,271

[22] Filed: Sep. 14, 1984

[51] Int. Cl.[4] ............................................. H02P 1/04
[52] U.S. Cl. ................................... 318/443; 318/444; 318/DIG. 2; 15/250 C
[58] Field of Search ................. 318/443, 444, DIG. 2; 15/250 C

[56] References Cited

U.S. PATENT DOCUMENTS

| | | | |
|---|---|---|---|
| 3,582,732 | 6/1971 | Kovalsky | 318/444 X |
| 3,638,030 | 1/1972 | Mellor | 15/250.02 X |
| 3,849,711 | 11/1974 | Elliott et al. | 318/444 X |
| 3,869,654 | 3/1975 | Bischoff et al. | 318/443 |
| 4,285,089 | 8/1981 | Takahashi et al. | 15/250.02 |
| 4,339,698 | 7/1982 | Kearns | 318/444 |
| 4,393,341 | 7/1983 | Byrne | 318/DIG. 2 X |

Primary Examiner—William M. Shoop, Jr.
Assistant Examiner—Bentsu Ro
Attorney, Agent, or Firm—R. M. Sigler

[57] ABSTRACT

A windshield cleaner control for a vehicle in which signals from separate washer and wiper actuating switches in the vehicle passenger compartment are voltage multiplexed on a single electric conductor through the firewall to washer and wiper actuating circuitry in the vehicle passenger compartment. A wiper actuating path is established including, in series, a source of electric power, a wiper motor actuating coil relay, the park switch and the washer motor, the internal impedance of the actuating coil being sufficiently greater than that of the washer motor that the latter is not activated by current flow through the former. The parallel wiper and washer switches are connected in series between the source of electric power and the electric conductor, park switch and washer motor, but a resistor in series with the wiper switch similarly prevents activation of the washer motor by the wiper switch. Circuit apparatus is responsive to either switch to establish an initial current through the actuating coil, with the park switch closing to complete the wipe cycle. A timer may be actuated along with the washer motor to activate the wiper motor for extra cycles of extra cleaning after deactivation of the washer motor.

6 Claims, 1 Drawing Figure

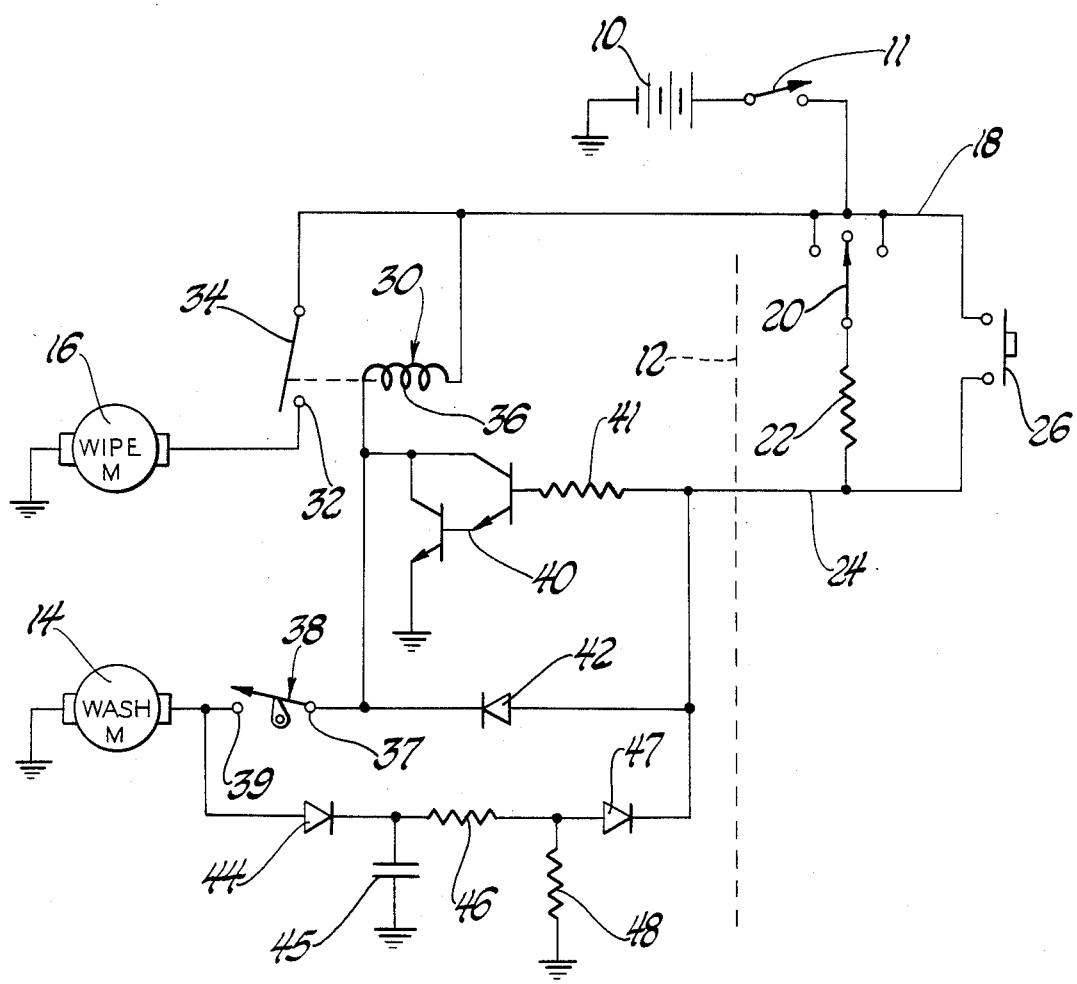

VEHICLE WINDSHIELD CLEANER CONTROL

BACKGROUND OF THE INVENTION

This invention relates to vehicle windshield cleaning apparatus having both washer and wiper motors, and particularly to such apparatus having minimal signal connections through the vehicle firewall from the operator control to the wiper and washer motors. It is desirable to minimize the signal connections as much as possible to reduce the cost and complexity of the vehicle wiring harnesses. This invention contributes to such reduction by combining wiper and washer motor actuating signals on a single, voltage multiplexed connection between separate actuating switches on the passenger side of the firewall and the washer and wiper motor circuitry on the engine side.

SUMMARY OF THE INVENTION

The invention is a windshield cleaner control for a motor vehicle having a wiper motor effective to drive a wiper across a windshield, washer apparatus including a washer motor effective to apply a cleaning fluid to the windshield in the path of the wiper and engine and passenger compartments separated by a firewall. It includes an electric conductor through the firewall and a wiper motor actuating circuit in the engine compartment comprising, in electrical series and in the following order, a source of electric power, the actuating coil of a wiper motor actuating relay, a park switch open only in a predetermined wiper park position, and the washer motor, the internal impedance of the actuating coil being sufficiently greater than that of the washer motor that current flow through the circuit sufficient to actuate the wiper motor does not actuate the washer motor. It further includes circuit means connecting the junction of the actuating coil and park switch to the electric conductor and switch control apparatus in the passenger compartment comprising first and second switches and a resistor, the first switch and resistor forming a series connected combination in parallel with the second switch between the source of electric power and the electric conductor, the resistor having an impedance sufficiently greater than the internal impedance of the washer motor that current flow through the first switch does not actuate the washer motor. It further includes means responsive through the electric conductor to closure of either of the first and second switches to establish a current flow through the actuating coil independently of the park switch to provide initial wiper motor actuation and thus close the park switch. Closure of the first switch results in actuation of the wiper motor only but closure of the second switch results in actuation of the washer motor. It may further include timer means actuated along with the washer motor to maintain the wiper motor in operation for a plurality of wipe cycles after deactivation of the washer motor.

Further details and advantages of this invention will be apparent from the accompanying FIGURE and following description of a preferred embodiment.

DESCRIPTION OF A PREFERRED EMBODIMENT

The FIGURE shows, schematically, the battery 10, ignition switch 11, firewall 12, washer motor 14 and wiper motor 16 of a motor vehicle. It is understood that the vehicle has a windshield with a wiper driven by wiper motor 16 in the normal manner through a repeating wiping pattern across the windshield and that washer motor 14 actuates a pump, not shown, to project a cleaning fluid onto the windshield in the path of the wiper, also in the normal manner. For simplicity, the windshield cleaner control is shown with only a single speed of single wipe or continuous wiping operation. Other functions, such as a second speed and intermittent wipe could obviously be added by one skilled in the art, although the second speed might require an additional connection through the firewall.

Further assumed are other normal parts of a motor vehicle which do not directly affect this invention and are thus not shown. For example, the vehicle electric power supply includes the normal engine driven generator and voltage regulator, all included within the symbolic representation of battery 10. Ignition switch 11 connects the positive terminal of battery 10 to a power line 18; and the ground terminal of battery 10 is connected through the vehicle chassis ground to other ground points, including the ground connections of any on board electronic equipment.

On the operator side of firewall 12, in the dashboard area of the passenger compartment, a wiper switch 20 and resistor 22 are connected in series between power line 18 and an electric conductor 24 comprising a wire of the vehicle wiring harness passing through firewall 12. Also on this side of firewall 12, a washer switch 26 is connected between power line 18 and electric conductor 24 and thus in parallel with the series combination of wiper switch 20 and resistor 22. Wiper switch 20 is an on-off switch for wiper operation with an open position as shown and two closed positions. One of the closed positions is a momentary contact, single wipe position from which it is biased into the open position when released. The other closed position is a continuous operation position in which it remains when set by the vehicle operator. Washer switch 26 is an actuation switch for the washer motor and is biased to return to the open state when released.

Wiper motor 16 is a permanent magnet DC motor with an armature winding grounded at one end and connected to normally open contact 32 of an actuating relay 30 at the other end. The armature 34 of relay 30, as well as one end of its actuating coil 36, is connected to power line 18 on the engine side of firewall 12. The other end of actuating coil 36 is connected to a first terminal 37 of park switch 38. Washer motor 14 is a permanent magnet DC motor with an armature connected between the second terminal 39 of park switch 38 and ground. Park switch 38 is a switch found in most vehicle windshield wiper systems which is cam operated into an open position when the wiper reaches an inner wipe or park position and is otherwise biased closed. Its normal function is to control the completion of a wipe cycle after the wiper operation switch is turned off.

A Darlington NPN transistor 40 has a collector connected to first terminal 37 of park switch 38, a grounded emitter and a base connected through a resistor 41 to electric conductor 24 on the engine side of firewall 12. A diode 42 has a cathode connected to first terminal 37 of park switch 38 and an anode connected to electric conductor 24 on the engine side of firewall 12.

If the vehicle operator desires wiper operation without washer operation, he closes wiper switch 20 to complete a circuit from battery 10 through ignition switch 11, wiper switch 20, resistor 22, resistor 41 and the emitter-base junction of transistor 40. Resistors 22 and 41 may each have a resistance of, for example, 360 ohms; and transistor 40 conducts through its collector-base junction to provide current flow from battery 10 through ignition switch 11 and actuating coil 36. Actuating coil 36 has an internal impedance of approximately 130 ohms, which constitutes almost all the resistance of this current path. Therefore, actuating coil 36 closes armature 34 against contact 32 to provide actuating current from battery 10 through ignition switch 11 and armature 34 to wiper motor 16.

As wiper motor 16 drives the wiper out of the inner wipe position, park switch 38 closes to provide an alternate current path to ground from actuating coil 36 through park switch 38 and washer motor 14. In addition, electric conductor 24 is shunted to ground, with the result that transistor 40 stops conducting. The internal impedance of the armature winding of washer motor 14 is only 2-3 ohms, which is negligibly small compared to the impedance of actuating coil 36. Therefore, although transistor 40 stops conducting, actuating coil 36 still receives almost full battery voltage; and relay 30 will remain actuated as long as park switch 38 remains closed. Thus a complete wipe cycle is ensured. If wiper switch 20 is closed in its momentary contact position, a single wipe cycle is provided for each actuation thereof. However, if wiper switch 20 is closed in its continuous position, transistor 40 is once again actuated to begin another cycle in continuous wiper operation as each wipe cycle ends with the opening of park switch 38.

When washer operation is desired, the operator closes washer switch 26. A conduction path is thus established from battery 10 through ignition switch 11, washer switch 26, resistor 41 and the base-emitter junction of transistor 40 to actuate relay 30 and begin wiper motor operation as in the previously described case of wiper operation. However, when park switch 38 closes, washer motor 14 receives full battery voltage through diode 42, assuming switch 26 remains closed. Washer motor 14 thus actuates the washer to apply cleaning fluid to the windshield as long as washer switch 26 remains closed, except for that small portion of each wipe cycle in which park switch 38 opens. This short non-wash portion of each cycle is an unintended but harmless consequence of this particular embodiment, which has nothing to do with this invention. If it is not desired, washer operation could be made continuous by providing additional means to extend washer operation through the open period of park switch 38, but this is not considered necessary in most applications. Washer operation may be given a programmed wash duration if desired by providing a programmed switching device in place of the simple embodiment of the washer switch 26 as shown.

Regardless of whether washer switch 26 provides programmed or operator controlled washer motor actuation duration, wiper motor 16 completes the wipe cycle in which the cleaning fluid is applied to the windshield so that the windshield is cleaned. However, it may be considered advisable to provide several additional wipe cycles to more thouroughly clean the windshield. For this reason additional circuitry is shown in the FIGURE. A diode 44 has an anode connected to the second terminal 39 of park switch 38 and a cathode connected through a capacitor 45 to ground and through a resistor 46 to the anode of a diode 47. The anode of diode 47 is also connected through a resistor 48 to ground; and the cathode of diode 47 is connected to electric conductor 24. In operation, when washer motor 14 is actuated, capacitor 45 is immediately charged to battery potential through diode 44 and remains charged as park switch 38 opens, until washer switch 26 opens, at which time it begins to discharge through resistor 48 to ground. While it is charged, it provides a high potential through diode 47 to the base of transistor 40 to provide repeating wipe cycles. The RC time constant of capacitor 45 and resistors 46 and 48, adjusted by the effect of resistor 41 and the emitter-base resistance of transistor 40 during the periods of transistor conduction, is adjusted to provide the desired number of additional wipe cycles.

The embodiments of the invention in which an exclusive property or privilege is claimed are defined as follows:

1. Windshield cleaner control apparatus for a motor vehicle having a wiper motor effective to drive a wiper across a windshield, washer apparatus including a washer motor effective to apply a cleaning fluid to the windshield in the path of the wiper and engine and passenger compartments separated by a firewall, the apparatus comprising, in combination:

an electric conductor through the firewall;

a wiper motor actuating circuit in the engine compartment comprising, in electrical series and in the following order, a source of electric power, the actuating coil of a wiper motor actuating relay, a park switch open only in a predetermined wiper park position, and the washer motor, the internal impedance of the actuating coil being sufficiently greater than that of the washer motor that current flow through the circuit sufficient to actuate the wiper motor does not actuate the washer motor;

circuit means connecting the junction of the actuating coil and park switch to the electric conductor;

switch control apparatus in the passenger compartment comprising first and second switches and a resistor, the first switch and resistor forming a series connected combination in parallel with the second switch between the source of electric power and the electric conductor, the resistor having an impedance sufficiently greater than the internal impedance of the washer motor that current flow through the first switch does not actuate the washer motor; and means responsive through the electric conductor to closure of either of the first and second switches to establish a current flow through the actuating coil independently of the park switch to provide initial wiper motor actuation and thus close the park switch, whereby closure of the first switch results in actuation of the wiper motor only but closure of the second switch results in actuation of the washer motor.

2. Windshield cleaner control apparatus for a motor vehicle having a wiper motor effective to drive a wiper across a windshield, washer apparatus including a washer motor effective to apply a cleaning fluid to the windshield in the path of the wiper and engine and passenger compartments separated by a firewall, the apparatus comprising, in combination:

an electric conductor through the firewall;
a source of electric power having first and second terminals;

first and second switches and a resistor in the vehicle passenger compartment, the first switch and resistor forming a series connected combination in parallel with the second switch between the first terminal of the source of electric power and the electric conductor;

a park switch normally closed but responsive to the position of the wiper to open in a predetermined wiper position, the park switch having a first terminal connected to the second terminal of the source of electric power through the washer pump motor and a second terminal;

a wiper motor actuating relay having an actuating coil, the actuating coil being connected in series between the second terminal of the park switch and the first terminal of the source of electric power and having an internal impedance greater than that of the washer pump motor such that current flow therethrough actuates the wiper motor actuating relay and thus the wiper motor but delivers insufficient electric power to the washer pump motor for the actuation thereof;

first circuit means connected between the actuating coil and the electric conductor and responsive through the latter to closure of either of the first and second switches to establish an initial current flow through the actuating coil to actuate the wiper motor with the park switch open, the closure of the park switch continuing current flow through the actuating coil and thus actuation of the wiper motor; and second circuit means connected between the second terminal of the park switch and the electric conductor, the second circuit means, park switch and washer pump motor having a total impedance less than that of the resistor such that closure of the first and park switches delivers insufficient elecric power to the washer pump motor for actuation thereof but closure of the second and park switches delivers electric power to the washer pump motor effective for the actuation thereof.

3. Windshield cleaner control apparatus for a motor vehicle having a wiper motor effective to drive a wiper across a windshield, washer apparatus including a washer motor effective to apply a cleaning fluid to the windshield in the path of the wiper and engine and passenger compartments separated by a firewall, the apparatus comprising, in combination:

an electric conductor through the firewall;

a source of electric power having first and second terminals;

first and second switches and a first resistor in the vehicle passenger compartment, the first switch and resistor forming a series connected combination in parallel with the second switch between the first terminal of the source of electric power and the electric conductor;

a park switch normally closed but responsive to the position of the wiper to open in a predetermined wiper position, the park switch having a first terminal connected to the second terminal of the source of electric power through the washer pump motor and a second terminal;

a wiper motor actuating relay having an actuating coil and an armature activatable thereby to connect the wiper motor in series with the source of electric power, the actuating coil being connected in series between the second terminal of the park switch and the first terminal of the source of electric power and having an internal impedance greater than that of the washer pump motor such that current flow therethrough actuates the wiper motor actuating relay and thus the wiper motor but delivers insufficient electric power to the washer pump motor for the actuation thereof;

a transistor having a collector connected to the actuating coil and the park switch, an emitter connected to the second terminal of the source of electric power and a base connected through a second resistor to the electric conductor on the engine side of the firewall, the transistor being responsive to closure of either of the first and second switches to establish an initial current flow through the actuating coil to actuate the wiper motor with the park switch open, the closure of the park switch continuing current flow through the actuating coil and thus actuation of the wiper motor; and unidirectional current conducting means connected between the second terminal of the park switch and the electric conductor on the engine side of the firewall, said means, together with the park switch and washer pump motor, having a total impedance less than that of the first resistor such that closure of the first and park switches delivers insufficient elecric power to the washer pump motor for actuation thereof but closure of the second and park switches delivers electric power to the washer pump motor effective for the actuation thereof.

4. Windshield cleaner control apparatus according to claim 1 and further comprising timer means having a control input connected to the junction of the washer motor and the park switch and activated by closure of the second switch, the means responsive through the electric conductor to either of the first and second switches being similarly responsive to the timer means to initiate additional wipe cycles after the closing and subsequent reopening of the second switch.

5. Windshield cleaner control apparatus according to claim 2 and further comprising timer means having a control input connected to the junction of the washer motor and the park switch, the timer means being activated by closure of the second switch to activate the first circuit means to initiate additional wipe cycles after subsequent reopening of the second switch.

6. Windshield cleaner control apparatus according to claim 2 and further comprising timer means having an input connected to the junction of the washer motor and park switch and an output connected to the electric conductor on the engine side of the firewall, the timer means comprising diodes at the input and output in series with a fast charge, slow discharge RC timer circuit, the diodes oriented to allow current flow only from input to output, the RC timer circuit being charged with closure of the second switch and discharged beginning with subsequent opening of the second switch but being effective until discharged to activate the transistor for additional cleaning wipes after the washer motor is deactivated, the timer means further including output resistance means sufficiently greater in impedance than the internal impedance of the washer motor that the washer motor is not reactivated thereby.

* * * * *